United States Patent Office 3,764,460
Patented Oct. 9, 1973

3,764,460
PROCESS OF DEINKING WASTE PAPER MATERIALS
Sho Miyamoto, Tokyo, Sachihiko Kurihara, Handa, and Shinichi Nishikawa, Tokyo, Japan, assignors to Japan Maize Products Co., Ltd., Tokyo, Japan
No Drawing. Filed Mar. 27, 1970, Ser. No. 23,475
Claims priority, application Japan, Apr. 1, 1969, 44/24,364; Apr. 23, 1969, 44/31,024; Sept. 22, 1969, 44/74,704
Int. Cl. D21c 5/02
U.S. Cl. 162—5
18 Claims

ABSTRACT OF THE DISCLOSURE

Printing ink on printed paper materials is deinked by the process of the present invention in which the printed paper materials are beaten in an aqueous system containing a polyolefin dispersed or emulsified in micro-fine particles with a surface active agent such as a dispersing agent or emulsifier, and then, resultant wastes containing the printing ink which are desorbed from the printed paper materials and adsorbed on the polyolefin particles are isolated from the system. Hydrophilic polymers such as starch, glue and carboxymethyl cellulose are effective for stabilizing the deinking system.

Further, it is helpful for sufficiently isolating the wastes to add organic solvents, emulsions containing the solvents, clays, or water soluble salts capable of disassociating the di- or polyvalent metal cation in water.

---

The present invention relates to a process of deinking waste paper material and particularly, relates to a process of deinking waste paper materials in an aqueous system containing micro-fine polyolefin or halogenated polyolefin particles while beating the paper material.

Recently, the demand for paper has rapidly increased in various fields, for example, newspapers, magazines, books, packing papers and leaflets. Thus, in order to meet the demand, it is required to reinforce supplying capacity of the paper as much as possible. However, owing to insufficient supplying capacities of raw wood material for manufacturing paper pulp, it is very difficult to sufficiently satisfy the present requirements. In consideration of these requirements, it is very valuable for reinforcing the supply capacity of paper by reclaiming waste paper material such as old newspapers, old magazines, old books, used packing papers and leaflets and other waste papers and converting them into usable fresh paper materials.

It is well-known that the deinking of the printed material, as indicated above is carried out by beating such material in an aqueous solution containing an alkali, for example, sodium hydroxide, sodium silicate, sodium carbonate and sodium phosphate, and a surface active agent, and isolating the waste material from the aqueous solution by the so-called "floatation method." In this conventional method, ink vehicles on the printed paper material surfaces are removed from the paper surface involving a procedure in which the vehicles are cracked and peeled by mechanical action of the beating and simultaneously softened or saponified by chemical effect of the alkali, and the coloring materials, for example, carbon black. The binders are separated from the paper material and absorbed on air particle surfaces rising to the aqueous solution surface.

However, such a method has the following disadvantages:

(1) insufficiently deinking which causes a low whiteness,
(2) undesirable decomposition of paper materials, and
(3) difficulty of isolating waste materials resulting from the deinking treatment.

An object of the present invention is to provide a process of deinking waste paper materials to obtain fresh paper having a high degree of whiteness.

Another object of the present invention is to provide a process of deinking waste paper materials without decomposition of the paper materials.

Still another object of the present invention is to provide a process of deinking printed paper materials the resultant waste material is easily isolable from the deinking material.

A still further object of the present invention is to provide a process of deinking waste paper materials in an aqueous system containing a deinking agent capable of being easily rinsed off from the paper material but not the alkali agent.

The present invention provides a process of deinking waste paper material which comprises beating the waste paper material, for example, old newspapers and magazines, in an aqueous system containing a polyolefin or halogenated polyolefin in the form of micro-fine particles with a surface active agent, and isolating the resulting waste materials in the aqueous system through the beating step.

The present invention is effective for deinking paper material printed with printing inks, such as newspapers, magazine, books, packing papers, leaflets, and the like.

The polyolefin which may be used include a high density polyethylene, low density polyethylene, atactic polypropylene, isotactic polypropylene, polybutene-1, their copolymers, and their mixtures thereof including their halides such as chlorides and fluorides, and mixtures thereof. Atactic polypropylene is particularly valuable in the present invention. This is a wax-like material at room temperature and is easily dispersed by vigorous stirring in the presence of a surface active agent at room temperature, preferably at a warm temperature. Further, the atactic polypropylene has a high deinking property. The atactic polypropylene is obtained as a by-product in the production of isotactic polypropylene, and is usable only as a fuel at present. Therefore, we can easily obtain it at a low price.

Also, chlorinated atactic polypropylene is useful in the process of the present invention.

The micro-fine polyolefin or halogenated polyolefin particles can be prepared by the following four methods.

(1) A polyolefin such as high density polyethylene and isotactic polypropylene is mechanically pulverized by means of a fine pulverizer such as a ball mill, or an ultra-fine pulverizer such as colloid mill, vibration mill, impact mill, jet mill into micro-fine particles having a diameter of several microns or less. The micro-fine polyolefin particles are dispersed in water with a surface active agent.

(2) A polyolefin such as a high or low polyethylene or isotactic polypropylene swells in an organic liquid and the swollen and softened polyolefin is pulverized by means of a fine-pulverizer as stated above. The resultant microfine polyolefin particles are dispersed in water with a surface active agent.

(3) A polyolefin, for example, atactic polypropylene is melted in water containing a surface active agent at the melting point thereof or a higher temperature in water, and the molten polyolefin is dispersed with the surface active agent in water with vigorous stirring.

(4) A polyolefin is dissolved in an organic solvent and the polyolefin solution is emulsified with a surface active agent in water. Particularly, the emulsified polyolefin is very important for the present invention due to easy preparation and high deinking property thereof.

The swelling agent in method (2) and solvent in method (4) may be selected from the organic liquids such as cyclic hydrocarbons such as benzene, toluene, xylene, cyclohexane, tetrahydronaphthalene and decahydro- naphthalene; aliphatic hydrocarbons such as butane, pentane, hexane, heptane, octane and their isomers; chlorinated hydrocarbons such as dichloromethane, tetrachloromethane, chloromethane, chloroform, ethylene chloride, trichloroethylene and tetrachloroethylene; ketones such as methylethyl ketone and methylisobutyl ketone; esters such as methyl acetate and ethyl acetate; petroleum solvents such as kerosene oil, light oil and gasoline, and mixtures thereof.

These organic liquids can swell a polyolefin at room temperature and dissolve at a high temperature that is at a temperature higher than 100° C.

The swollen polyolefin is easily pulverized by vigorous mechanical stirring and dispersed with a surface active agent in water.

The surface active agent effective for the process of the present invention may be selected from anionic, cationic, non-ionic and amphoteric surface active compounds.

The anionic surface active compounds include fatty acid soaps, naphthenic acid soaps, Turkey red oil, surface sulfuric acid fatty ester salts, sulfonated higher fatty acid ester salts, fatty acid ester sulfuric acid ester salts, higher fatty alcohol sulfuric acid ester salts, alkyl sulfuric ester salts, alkyl sulfates, alkylacryl sulfates, fatty acid amide sulfates, secondary alcohol sulfuric acid ester salts, alkyl phosphorous acid esters, phosphoric acid alkyl esters, alkyl phosphoric salts, alkyl phenol-polyethylene glycols or sulfuric acid ester sodium salts, and mixtures thereof.

The cationic surface active compounds include fatty amines quaternary alkyl ammonium compounds, quaternary alkylaryl ammonium compounds and mixtures.

The non-ionic surface active compounds include polyoxylethylene alkyl esters, polyoxyethylene alkyl esters, polyoxyethylene alkylaryl ethers, higher alcohol fatty acid esters, polyoxyethylene sorbitan fatty acid esters, polyoxyethylene alkylamines, fatty acid alkanol amides, polyoxyethylene-polyoxypropylene block copolymers, polyoxyl ethylene alkylthioethers, and these mixtures thereof.

Also, the amphoteric surface active compounds include betain-type compounds, sulfobetain-type compounds, sulfuric acid ester-type amphoteric compounds and phosphoric acid ester-type amphoteric compounds.

The deinking agent comprising a polyolefin or halogenated polyolefin dispersion or emulsion is added to the aqueous beating system, and uniformly mixed and then, the beating of the waste paper materials is carried out in conventional manner. The printing ink on the waste paper materials is separated therefrom and adsorbed on the surfaces of the polyolefin or halogenated polyolefin particles. Then, the wastes containing the particles adsorbing the printing ink are isolated from the beaten aqueous system and rises to the aqueous system's surface. The isolation is helped by the "floatation method" in which numerous fine air particles rise from the bottom of the beaten aqueous system to the surface of the system, and the wastes are adsorbed on the air particle surfaces so as to rise together. The air particles floating on the beating system's surface, which have been caught by the wastes adsorbing the printing ink, are removed from the beating system by a suitable manner such as over flowing, filtering and scooping.

The addition of the emulsion or dispersion may be carried out before beating, while beating or after beating. Preferably, the addition is carried out before beating due to its high deinking effect. The deinking treatment may be carried out at room temperature or at a temperature below approximately 60° C.

The present invention includes an improvement for stabilizing the emulsion or dispersion containing the polyolefin or the halogenated polyolefin particles. In the improvement, the emulsion or dispersion of the polyolefin or halogenated polyolefin further includes at least one hydrophilic polymer as a protective colloid such as starch, oxidized starch, starch phosphate, glue, casein, carboxymethyl starch, carboxymethyl cellulose, polyvinyl alcohol, sodium alginate and polyacrylamide.

The present invention includes an improvement effective for isolating the wastes in the aqueous system. When the wastes are insufficiently isolated from the aqueous system, at least one member selected from organic solvents effective for the polyolefin or the halogenated polyolefin, as stated hereinbefore, aqueous emulsions containing the organic solvent and the hydrophilic polymers stated above, and clays such as kaolin and bentonite, are further added to the aqueous system in order to further isolate residual wastes remaining in the beaten paper materials.

These additions may be added to the aqueous system before beating, while beating or after beating. Sometimes, it is very effective for isolating the residual wastes that the organic solvent or the aqueous emulsion is firstly added into the aqueous system and then the clay is added thereto.

The present invention further includes another improvement effective for isolating the wastes. In this improvement, at least one water soluble metal salt which is capable of dissociating into a di- or poly-valent metal cation in water is further added to the aqueous system, before beating, while beating or after beating. This addition is effective for further isolating the residual wastes remaining in the beaten paper materials.

The water soluble metal salts include salts such as calcium chloride, magnesium chloride, barium chloride, zinc sulfate, basic lead acetate and aluminum sulfate produces di- or poly-valent metal cation such as $Ca^{++}$, $Mg^{++}$, $Ba^{++}$, $Zn^{++}$, $Pb^{++}$ and $Al^{+++}$ in water. The cations neutralize the waste particles the surfaces of which are anionically charged in water. This neutralization causes flocculation of the waste particles and assist in isolating the waste particles. However, excess addition of the cation causes a charging change in the waste particles, that is the waste particles become cationic. Thus, it is desirable to add the metal salt in an adequate quantity.

The present invention further includes still another improvement effective for isolating the waste particles. In such an improvement, a water insoluble metal salt such as calcium oxalate and calcium sulfate is produced in the aqueous system by first adding a water soluble alkali compound such as milk of lime and then adding an acid such as oxalic acid or sulfuric acid. The water insoluble metal salts thus produced flocculates together with the waste particles. Therefore, this is valuable for separating the waste material, and further separation of the residual wastes.

Through the process of the present invention, the old printed paper materials can be reclaimed into fresh paper having a high degree of whiteness and the polyolefins or halogenated polyolefins having limited use such as atactic polypropylene and chlorinated atactic polypropylene are valuably utilized.

The following examples are given for the purpose of illustrating the present invention. All quantities shown in the examples are on a weight basis unless otherwise indicated.

EXAMPLE 1

An aqueous deinking emulsion was prepared from 4 parts of atactic polypropylene, 4 parts of toluene and 20 parts of Genbu Clean (anionic emulsifier made by Daiichi Kogyo Seiyaku Kabushiki Kaisha, Japan). The atactic polypropylene was dissolved in toluene and the solution was mixed with Genbu Clean. The mixture was added to 72 parts of water with vigorous stirring for 5 minutes. 4 parts of the aqueous emulsion, 5000 parts of water and 100 parts of old newspaper were charged in a TAPPI type beating machine and then the old newspapers were beaten at a beating rate of 2000 r.p.m. for 20 minutes at room temperature. All of the printing ink on the old newspaper was adsorbed on the emulsified polypropylene particles, and thus formed waste particles in the aqueous system. The waste particles floated on the aqueous system's surface by subjecting to the flotation method for 10 minutes. The floated waste was removed by overflowing and, the resultant pulp was rinsed with water. The resultant pulp had a satisfactory whiteness of 58.

EXAMPLE 2

The procedure of Example 1 was repeated except that the aqueous emulsion consisted of 4 parts of isotactic polypropylene, 6 parts of kerosene and 20 parts of Solnone (anionic emulsifier made by Nihon Yushi Kabushiki Kaisha, Japan), and 5 parts of the aqueous emulsion, 100 parts of old magazine papers and 5000 parts of water and this mixture was charged in the beating machine.

The resultant paper pulp had a satisfactory whiteness of 58.

EXAMPLE 3

The procedure of Example 1 was repeated except that the aqueous emulsion was prepared from 20 liters of an aqueous solution containing 1000 g. of starch, 500 grams of oleyl dimethyl benzyl ammonium chloride (cationic emulsifier) and 5 liters of n-hexane solution containing 1 kg. of chlorinated atactic polypropylene.

The resultant paper pulp had a satisfactory whiteness of 55.

EXAMPLE 4

The procedure of Example 1 was repeated except that the aqueous emulsion was prepared from 20 liters of an aqueous solution containing 1000 g. of polyvinyl alcohol, 750 grams of Marseille soap and 7 liters of kerosene solution containing 1 kg. of high density polyethylene, and the beating was carried out at a temperature of 60° C.

The resultant paper pulp had a satisfactory whiteness of 55.

EXAMPLE 5

An aqueous deinking dispersion was prepared in a manner in which 500 g. of stearyl dimethyl benzyl ammonium chloride (cationic dispersing agent) were dissolved into 20 liters of a solution containing 1 kg. of carboxymethyl starch, 1 kg. of atactic polypropylene was swollen in 7 liters of kerosene and then ground down and the ground down polypropylene was dispersed into the solution with vigorous stirring at room temperature for 15 minutes.

An aqueous beating system was prepared from 50 kg. of the aqueous deinking dispersion, 1000 kg. of old newspapers and 50,000 kg. of water at a temperature of 40° C.

After the beating was carried out in the same manner as indicated in Example 1 for 20 minutes, 10 liters of kerosene was added into the beating system, and the beating system was agitated for 10 minutes. The isolating was carried out in the same manner as indicated in Example 1. The resultant paper pulp had a satisfactory whiteness of 60 and a weight of 850 kg.

EXAMPLE 6

An aqueous deinking dispersion was prepared from 20 liters of an aqueous solution containing 1 kg. of polyacrylamide, 600 g. of polyoxyethyelne oleyl phenol ether, 1 kg. of polybutene-1 and 7 liters of trichloroethylene in the same manner as indicated in Example 5. The beating and isolating procedures were carried out in the same manner as illustrated in Example 5 except that after the beating was finished and the resultant wastes were removed, 100 g. of bentonite was added into the aqueous system for isolating the residual wastes. The resultant paper pulp had a satisfactory whiteness of 62 and weighed 700 kg.

EXAMPLE 7

An aqueous deinking dispersion was prepared from 20 liters of an aqueous solution containing 1.5 kg. of oxidized starch, 600 g. of oleylamino polyethylene glycol sulfonate sodium salt (amphoteric dispersing agent), 1 kg. of atactic polypropylene and 5 liters of methylisobutyl ketone in the same manner as illustrated in Example 5. The beating and isolating procedures were carried out in the same manner as shown in Example 6 except that a mixture of 100 g. of kaolin and an emulsion prepared from 20 liters of an aqueous solution containing 1 kg. of sodium alginate, 100 g. of oleyl dimethyl benzyl ammonium chloride and 5 liters of n-octane was added into the beaten aqueous system instead of the bentonite.

There was obtained 700 kg. of paper pulp having a satisfactory whiteness of 60.

EXAMPLE 8

The procedure of Example 7 was repeated except that, instead of the bentonite, 250 liters of an aqueous solution containing 1 mol of magnesium chloride was added into the beaten aqueous system.

There was obtained 800 kg. of pulp having a satisfactory whiteness of 62.

EXAMPLE 9

The procedure of Example 7 was repeated except that, instead of the bentonite, 250 liters of an aqueous solution containing 1.5 mol of aluminum sulfate was used.

There was obtained 900 kg. of pulp having a satisfactory whiteness of 61.

EXAMPLE 10

The procedure of Example 7 was repeated except that, instead of the bentonite, 500 liters of milk of lime containing 0.5 mol of calcium hydroxide was added into the aqueous system and then 250 liters of an aqueous solution containing 1 mol of oxalic acid was added so as to produce calcium oxalate precipitations.

There was obtained 700 kg. of pulp having a satisfactory whiteness of 60.

EXAMPLE 11

The procedure of Example 7 was repeated except that 250 liters of an aqueous solution containing 125 kg. of basic lead acetate was used instead of the bentonite.

There was obtained 900 kg. of pulp having a satisfactory whiteness of 60.

EXAMPLE 12

The procedure of Example 7 was repeated except that the aqueous deinking dispersion was prepared by dispersing 1 kg. of atactic polypropylene in 20 liters of the solution containing 500 g. of stearyl dimethyl benzyl ammonium chloride and 1 kg. of carboxymethyl starch while melting at a temperature of 95° C.

There was obtained 800 kg. of pulp having a satisfactory whiteness of 60.

EXAMPLE 13

The procedure of Example 7 was repeated except that the aqueous deinking dispersion was prepared by dispersing 1 kg. of isotactic polypropylene fine-powder in 20 liters of aqueous solution containing 500 g. of stearyl dimethyl benzyl ammonium chloride and 1 kg. of carboxymethyl cellulose.

There was obtained 800 kg. of pulp having a satisfactory whiteness of 59.

What we claim is:

1. A process of deinking waste papers comprising the steps of
   (a) beating said waste paper in water,
   (b) adding thereto a substantially aqueous emulsion consisting essentially of micro-fine particles of a member selected from the group consisting of polyolefins and halogenated polyolefins and a surface active agent, and
   (c) and isolating the waste present in said aqueous system.

2. A process as set forth in claim 1, wherein said micro-fine particles are prepared using the following steps: (1) dissolving said particles in an organic solvent, and (2) emulsifying in water with said surface active agent.

3. A process as set forth in claim 1, wherein said polyolefin is selected from the group consisting of polyethylene, polypropylene, polybutene-1, copolymers and mixtures thereof.

4. A process as set forth in claim 3, wherein said polyolefin is an atactic polypropylene.

5. A process as set forth in claim 1, wherein said halogenated polyolefin is selected from the group consisting of chlorinated and fluorinated polyethylenes, polypropylenes, polybutenes-1, copolymers, and mixtures thereof.

6. A process as set forth in claim 4, wherein said halogenated polyolefins is a chlorinated atactic polypropylene.

7. A process according to claim 2, wherein said solvent is selected from the group consisting of cyclic hydrocarbons, aliphatic hydrocarbons, chlorinated hydrocarbons, ketones, esters, petroleum solvents, and mixtures thereof.

8. A process according to claim 7, wherein said cyclic hydrocarbon solvent is selected from the group consisting of benzene, toluene and xylene, cyclohexane, tetrahydronaphthalene, and decahydronaphthalene.

9. A process according to claim 7, wherein said aliphatic hydrocarbon is selected from butane, pentane, hexane, heptane, octane, and isomers thereof.

10. A process according to claim 7, wherein said chlorinated hydrocarbon is selected from the group consisting of dichloromethane, tetrachloromethane, chloromethane, chloroform, ethylene chloride, trichloroethylene, and tetrachloroethylene.

11. A process according to claim 7, wherein said ketone is methylethyl ketone or methylisobutyl ketone.

12. A process according to claim 7, wherein said ester is methyl acetate or ethyl acetate.

13. A process according to claim 7, wherein said petroleum solvent is selected from the group consisting of kerosene oil, light oil, and gasoline.

14. A process according to claim 1, wherein said surface active agent is selected from (1) the group consisting of anionic surface active compounds selected from the group consisting of fatty acid soaps, naphthenic acid soaps, Turkey red oil, sulfuric acid fatty ester salts, sulfonated higher fatty acid ester salts, fatty acid ester sulfuric ester salts, fatty acid amide sulfuric acid ester salts, higher fatty alcohol sulfuric ester salts, alkyl sulfuric acid ester salts, alkyl sulfates alkylaryl sulfates fatty acid amide sulfates, secondary alcohol, sulfuric acid ester salts, alkyl phosphorous acid esters, phosphoric acid alkyl esters, alkyl phosphoric acid salts, and alkyl phenolpolyethylene, glycol sulfuric ester sodium salts; (2) cationic surface active compounds selected from the group consisting of such as fatty amines, quaternary alkyl ammonium compounds, quaternary alkylaryl ammonium compounds, basic alkyl pyridinium salts, basic alkyl picolinium salts and alkyl benzimidazole derivatives; amphoteric (3) surface active compounds, such as betain-type compounds, sulfobetain-type compounds, sulfuric acid ester-type amphoteric compounds, and phopshoric acid ester-type amphoteric compounds; and (4) non-ionic surface active compound such as polyoxyethylene alkyl esters polyoxyethylene alkyl ethers, polyoxyethylene alkyl aryl ethers, higher alcohol fatty acid esters, polyoxyethylene sorbitan fatty acid esters, polyoxyethylene alkylamines, fatty acid alkanol amides, polyoxyethylene-polyoxypropylene block copolymers, and polyoxyethylene alkylthioethers.

15. A process according to claim 1, wherein said aqueous system further comprises at least one hydrophilic polymer as a protective colloid.

16. A process according to claim 15, wherein said hydrophilic polymer is selected from the group consisting of starch, oxidized starch, starch phosphate, glue, casein, carboxymethyl starch, carboxymethyl cellulose, polyvinyl alcohol, sodium alginate, and polyacrylicamide.

17. A process as set forth in claim 1, wherein said isolation step is carried out in the presence of at least one organic solvent selected from the group consisting of cyclic hydrocarbons, aliphatic hydrocarbons, chlorinated hydrocarbons, ketones, esters, petroleum solvents and mixtures thereof, aqueous emulsions containing said organic solvents and hydrophilic polymers selected from the group consisting of starch, oxidized starch, starch phosphate, glue, casien carboxymethyl starch, carboxymethyl cellulose, polyvinyl alcohol, sodium alginate and polyacrylicamide and clays in said aqueous system.

18. A process as set forth in claim 17, wherein said clay is kaolin or bentonite.

References Cited

UNITED STATES PATENTS

| | | | |
|---|---|---|---|
| 3,051,610 | 8/1962 | Grossmann et al. | 162—5 |
| 2,703,754 | 3/1955 | Myers | 162—5 |

S. LEON BASHORE, Primary Examiner

W. F. SMITH, Assistant Examiner